United States Patent
Kong et al.

(10) Patent No.: US 7,594,338 B2
(45) Date of Patent: Sep. 29, 2009

(54) CONTOUR MEASURING PROBE FOR MEASURING ASPECTS OF OBJECTS

(75) Inventors: Jian-Bin Kong, Shenzhen (CN); Qing Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 96 days.

(21) Appl. No.: 11/966,954

(22) Filed: Dec. 28, 2007

(65) Prior Publication Data

US 2009/0094849 A1 Apr. 16, 2009

(30) Foreign Application Priority Data

Oct. 12, 2007 (CN) .................. 2007 1 0202037

(51) Int. Cl.
*G01B 5/012* (2006.01)

(52) U.S. Cl. .................. 33/556; 33/559; 33/DIG. 2

(58) Field of Classification Search .............. 33/556, 33/557, 558, 559, 560, 561, DIG. 2
See application file for complete search history.

(56) References Cited

U.S. PATENT DOCUMENTS

| 4,177,568 | A | * | 12/1979 | Werner et al. ............... 33/561 |
| 4,716,657 | A | * | 1/1988 | Collingwood ............... 33/561 |
| 5,168,638 | A | * | 12/1992 | Barton ...................... 33/561 |
| 5,414,940 | A | * | 5/1995 | Sturdevant ................. 33/559 |
| 6,459,281 | B1 | * | 10/2002 | Carli ......................... 33/561 |
| 7,398,603 | B2 | * | 7/2008 | Liu et al. ................... 33/559 |
| 2001/0022036 | A1 | * | 9/2001 | Nishimura et al. .......... 33/556 |
| 2007/0137058 | A1 | * | 6/2007 | Liu et al. ................... 33/561 |
| 2009/0007449 | A1 | * | 1/2009 | Liu et al. ................... 33/556 |

\* cited by examiner

*Primary Examiner*—G. Bradley Bennett
(74) *Attorney, Agent, or Firm*—Frank R. Niranjan

(57) ABSTRACT

An exemplary contour measuring probe (10) includes a tip extension (16) and two driving members (13). The tip extension is configured for touching a surface of an object. The driving members are configured for driving the tip extension linearly moving along a first direction. The driving members are tapered and a diameter of each driving member increases along the first direction. The driving members are driven to move by gas pressure acting on an outer side surface thereof.

14 Claims, 5 Drawing Sheets

CONTOUR MEASURING PROBE FOR MEASURING ASPECTS OF OBJECTS

CROSS-REFERENCE TO RELATED APPLICATIONS

This application is related to nine co-pending U.S. patent applications, which are: application Ser. No. 11/611,724, filed on Dec. 15, 2006, and entitled "DISTANCE MEASURING PROBE WITH AIR DISCHARGE SYSTEM", application Ser. No. 11/843,664, filed on Aug. 23, 2007, and entitled "CONTOUR MEASURING DEVICE WITH ERROR CORRECTING UNIT", applications Ser. Nos. 11/966,951 and 11/966,952 and both entitled "CONTOUR MEASURING PROBE", applications Ser. Nos. 11/966,957 and 11/966,956, and both entitled "CONTOUR MEASURING METHOD FOR MEASURING ASPECTS OF OBJECTS", application Ser. No. 11/966,964, and entitled "MEASURING DEVICE FOR MEASURING ASPECTS OF OBJECTS", application Ser. No. 11/966,961, and entitled "MEASURING DEVICE AND METHOD FOR USING THE SAME", and application Ser. No. 11/966,959, and entitled "BASE AND CONTOUR MEASURING SYSTEM USING THE SAME". In Ser. No. 11/611,724, Ser. Nos. 11/843,664 , 11/966,951 , 11/966,957, and 11/966,956, the inventors are Qing Liu, Jun-Qi Li, and Takeo Nakagawa. In Ser. Nos. 11/966,961, 11/966,964, 11/966,959, and 11/966,952, the inventors are Qing Liu and Jun-Qi Li. In Ser. No. 11/611,724 and Ser. No. 11/843,664, the assignee is Hon HAI PRECISION INDUSTRY CO. LTD and FINE TECH Corporation, and the assignee of other applications is HONG FU JIN PRECISION INDUSTRY (ShenZhen) CO., LTD and Hon HAI PRECISION INDUSTRY CO. LTD. The disclosures of the above identified applications are incorporated herein by reference.

BACKGROUND OF THE INVENTION

1. Field of the Invention

The present invention relates generally to contour measuring probes for coordinate measuring machines (CMMs); and more particularly to a contour measuring probe using a relatively small, steady measuring force for contact-type contour measuring devices.

2. Discussion of the Related Art

Manufactured precision objects such as optical components (for example, aspherical lenses) and various industrial components need to be measured to determine whether manufacturing errors of the objects are within acceptable tolerance. Manufacturing errors are the differences between design dimensions of the object and actual dimensions of the manufactured object. Measured dimensions of the manufactured object are usually regarded as the actual dimensions. Precision measuring devices are used to measure the objects; and the more precise the measuring device, the better. Generally, the precision objects are measured with a CMM, which has a touch trigger probe that contacts the objects. A measuring force applied to the touch trigger probe of the coordinate measuring machine should be small and steady. If the measuring force is too great, a measuring contact tip of the touch trigger probe may easily be damaged resulting in measuring errors. If the measuring force is not steady, a relatively large measuring error may occur.

As indicated above, a contact-type coordinate measuring device is commonly used to measure dimensions of precision objects such as optical components and certain industrial components. A measuring force is applied to the touch trigger probe by the coordinate measuring device. However, if the object has a slanted surface, the contact tip of the touch trigger probe may bend or deform by a counterforce acting on the touch trigger probe, thereby causing a measuring error. Therefore, the touch trigger probe is not ideal for measuring precision lenses having slanted surfaces.

Nowadays, two methods are generally used to reduce a measuring force on the touch trigger probe. In a first method, the contact tip is obliquely arranged so that a component force of gravity acting on the measuring contact tip is regarded as a measuring force. The contact tip is very light, so the measuring force is very small accordingly. However, if an oblique angle of the contact tip changes during measuring, the measuring force will also change, which makes the measuring force difficult to control. In a second method, the touch trigger probe is configured with a spring. An elastic force of the spring is regarded as a measuring force. However, when the contact tip moves upward and downward along the surface of the object being measured, a vibration of the upward and downward movement may cause the spring to resonate and deform. Therefore, the measuring force varies with the deformation of the spring. Thus both methods are subjected to errors in the measurement results.

In another kind of probe, a measuring force is provided by an air pump. However, the air pump provides pulsed pressure. Therefore, the air pump cannot provide a small, steady measuring force.

Therefore, a contour measuring probe employing a relatively small, steady measuring force is desired.

SUMMARY

An exemplary contour measuring probe includes a tip extension and two driving members. The tip extension is configured for touching a surface of an object. The driving members are configured for driving the tip extension linearly moving along a first direction. The driving members are tapered and a diameter of each driving member increases along the first direction. The driving members are driven to move by gas pressure acting on an outer side surface thereof.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present contour measuring probe. Moreover, in the drawings, like reference numerals designate corresponding parts throughout the several views, and all the views are schematic.

DETAILED DESCRIPTION OF THE EMBODIMENTS

Figure 1:
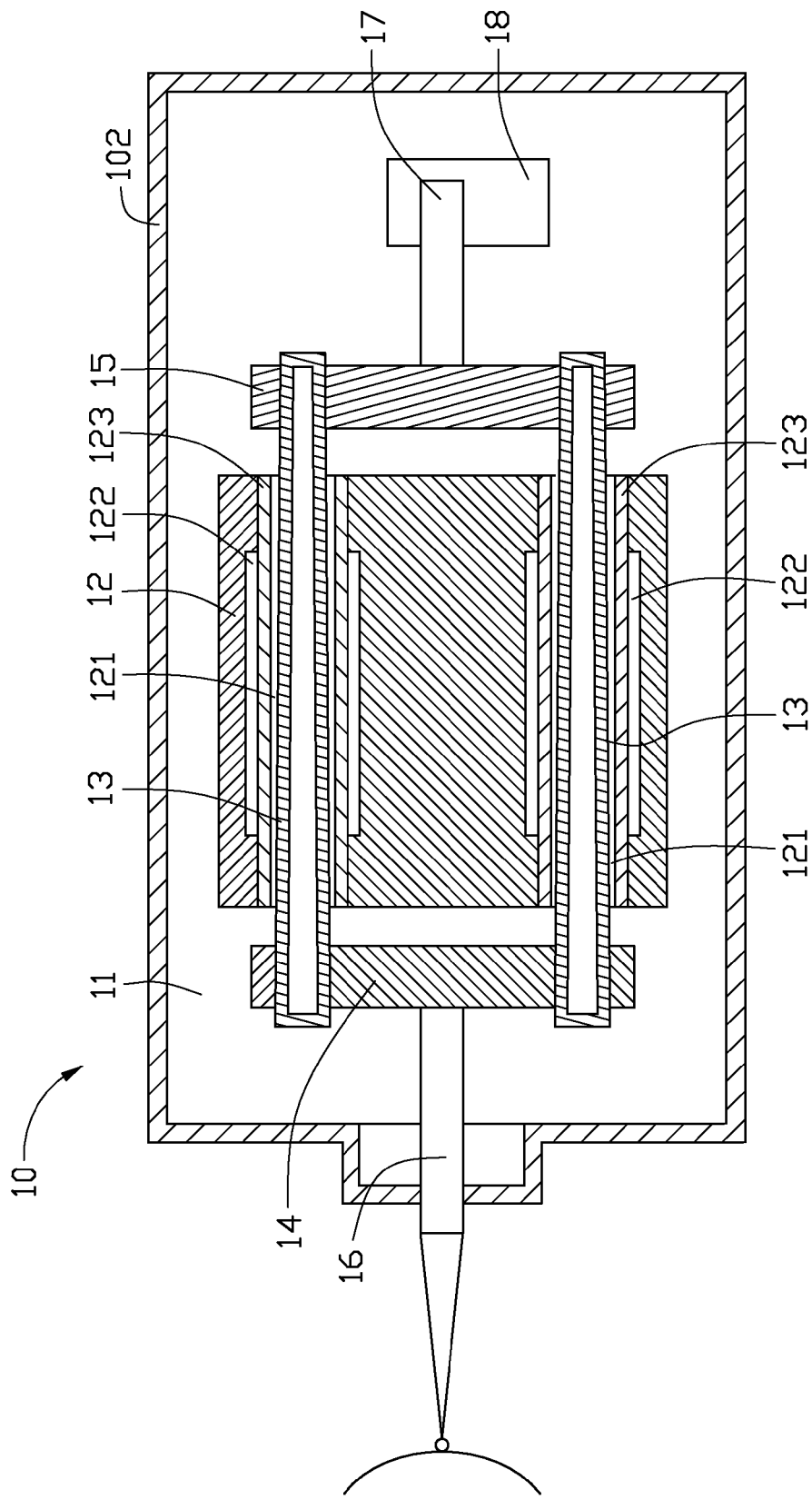
FIG. 1 is a top plan, cross-sectional view of a contour measuring probe in accordance with a first embodiment of a contour measuring probe for measuring aspects of objects of the present invention.
Figure 2:
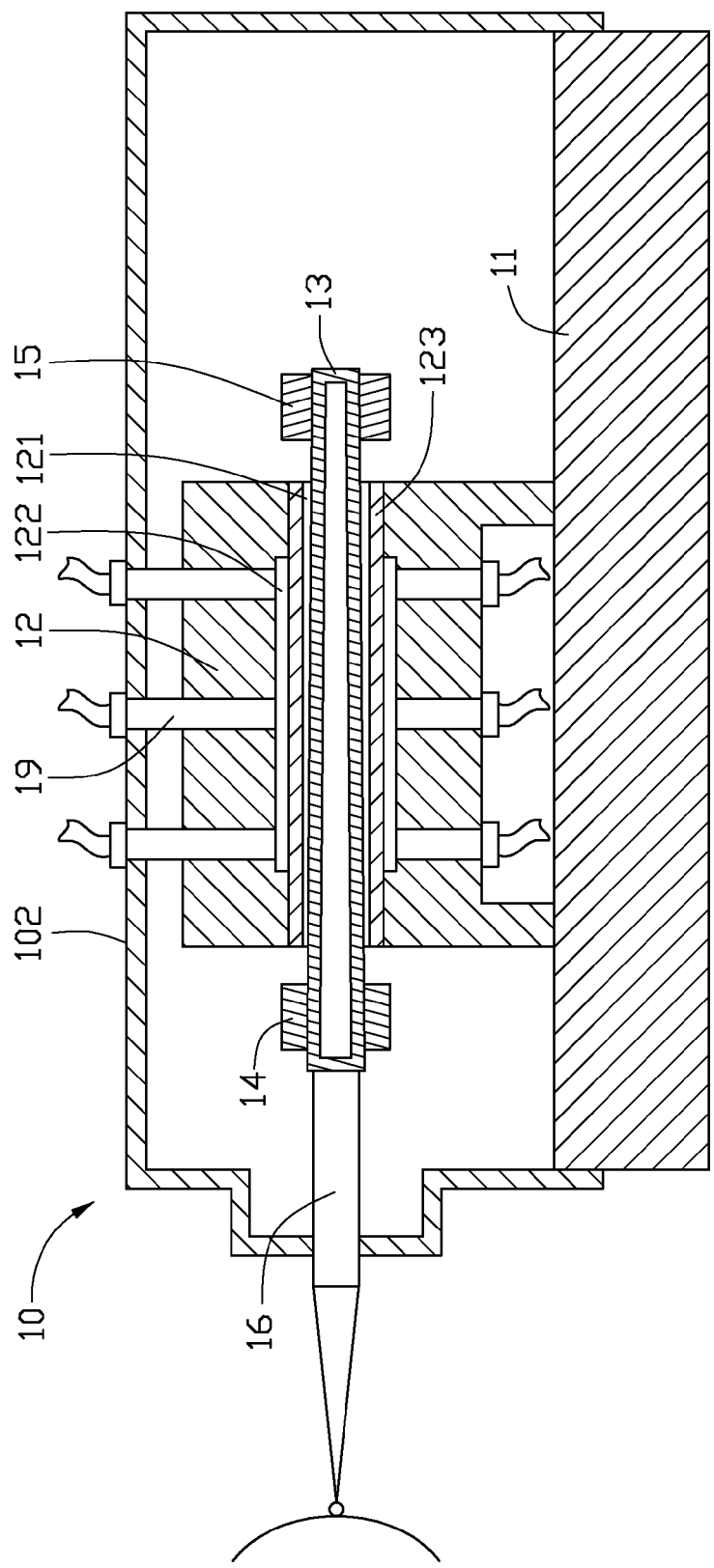
FIG. 2 is a side, cross-sectional view of the contour measuring probe of FIG. 1.

FIG. 1 and FIG. 2 shows a contour measuring probe 10 of a first embodiment of the present invention. The contour measuring probe 10 includes a base 11, a tube guide 12, two hollow tubes 13, a first fixing member 14, a second fixing member 15, a tip extension 16, a linear measuring scale 17, a displacement sensor 18, and a plurality of pipes 19.

The base 11 is substantially a flat rectangular sheet. It should be understood that the base 11 may alternatively be any other shapes. The tube guide 12 is securely mounted onto the base 11. The tube guide 12 includes a front end and a rear end. The tube guide 12 defines two tube chutes 121 extending from the front end to the rear end correspondingly. The tube chutes 121 are spaced apart from, and aligned parallel to, each other. A sidewall for defining each tube chute 121 defines a ring-shaped slot 122 communicating with the tube chutes 121. A porous film 123 is disposed inside each tube chute 121 of the tube guide 12 and between the slot 122 and the corresponding tube chute 121. The films 123 are generally made of carbon having a plurality of micro holes allowing gas to spread therethrough. The hollow tubes 13 are hollow frustums of a cone. Each hollow tube 13 is received through a corresponding tube chute 121 of the tube guide 12, and a diameter of the hollow tubes 13 increases from the front end to the rear end of the tube guide 12. A gap (not labeled) is defined between each film 123 and the tube guide 12, such that a gas bearing can be formed when gas is injected into the tube chutes 121. The pipes 19 are inserted into the tube guide 12 and are spaced from each other. The pipes 19 are communicated with the slots 122 so as to inject gas into the slots 122.

The first fixing member 14 and the second fixing member 15 are correspondingly fixed to two opposite ends of the hollow tubes 13. The hollow tubes 13 are slidable in the tube guide 12 in a direction parallel to a direction defined by a line joining the front end to the rear end of the tube guide 12. The hollow tubes 13 are non-rotatable relative to the tube guide 12. The tip extension 16 is needle-shaped, and has a contact tip (not labeled) that touches a surface of an object when the contour measuring probe 10 is used for measuring the object. The tip extension 16 is fixed on the first fixing member 14 so that the tip extension 16 is linearly movable together with the first fixing member 14 and the hollow tubes 13. The linear measuring scale 17 is fixed on the second fixing member 15 such that it moves (displaces) linearly when the tip extension 16 moves. The displacement sensor 18 is mounted on the base 11 corresponding to the linear measuring scale 17. The displacement sensor 18 is used for reading displacement values of the linear measuring scale 17. Alternatively, the positions of the linear measuring scale 17 and the displacement sensor 18 may be exchanged.

The contour measuring probe 10 further includes a cover 102 that engages with the base 11 and completely seals other various components of the contour measuring probe 10 except the base 11 and a part of the tip extension 16. The cover 102 defines a through hole (not labeled) for allowing an end portion including the contact tip of the tip extension 16 to extend out from the through hole. The gas is injected into the slots 122 to form the gas bearing via the pipes 19 mounted to the cover 102.

Figure 3:
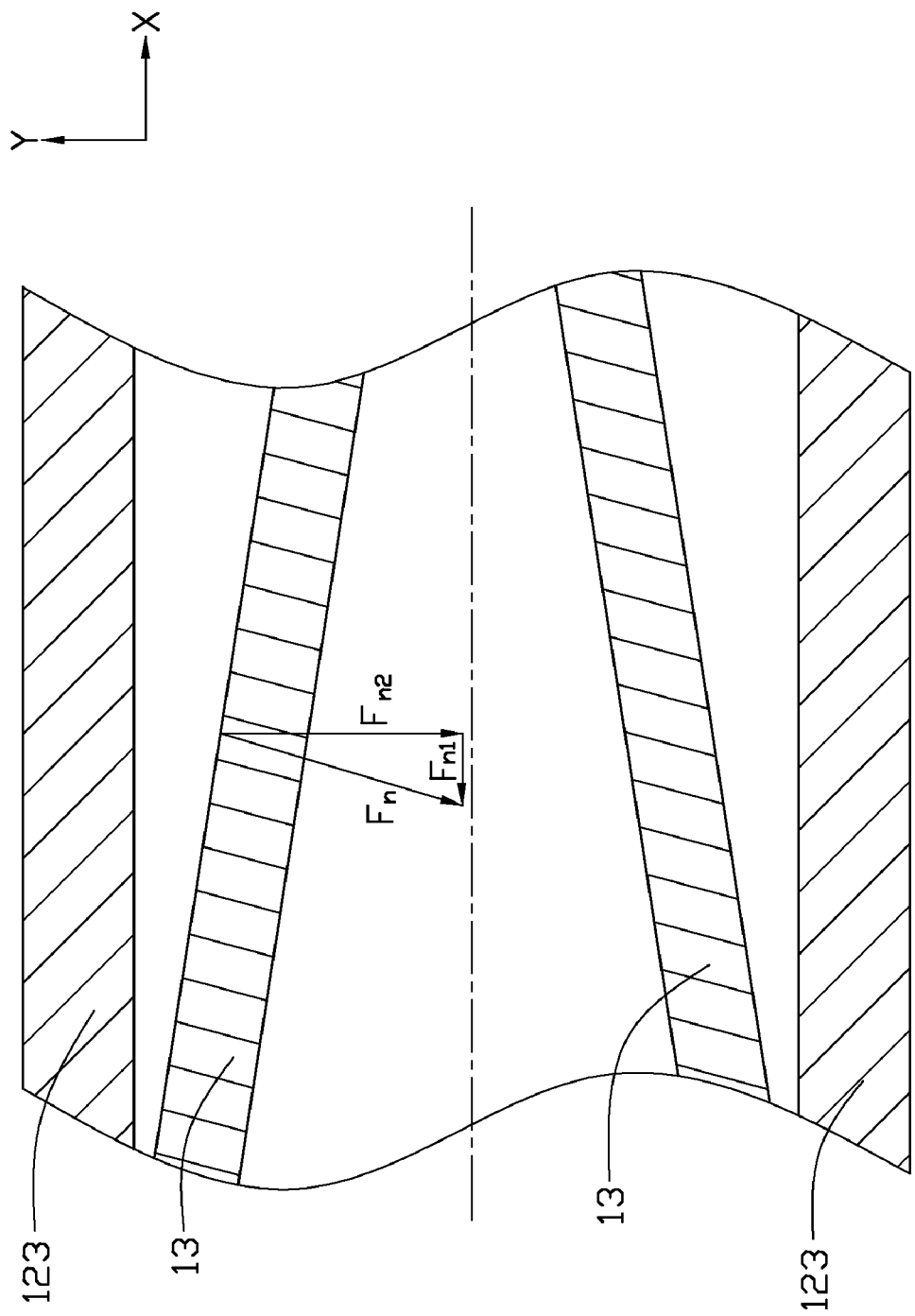
FIG. 3 is a force analysis view of hollow tubes of the contour measuring probe of FIG. 1.

When gas is injected into the pipes 19, gas fills in the slots 122 of the tube guide 12. With gas continually injected into the slots 122, a pressure in the slots 122 increases. Meanwhile, gas spreads into and fills the gaps between the hollow tubes 13 and the films 123 of the tube guide 12, thereby forming a gas bearing. Also referring to FIG. 3, a plurality of pressure forces Fn acts on an outer side surface of each hollow tube 13, because gas enters the gap between the hollow tube 13 and the films 123 and the hollow tubes 13 are taper-shaped. The forces Fn have a direction perpendicular to the outer side surface of each hollow tube 13. Each force Fn can be divided into a force Fn1 having a direction parallel to an axis of each hollow tube 13 and a force Fn2 having a direction perpendicular to the axis. A plurality of forces Fn2 are such that a force, in a direction perpendicular to the axis of each hollow tube 13, acting on each hollow tube 13 is 0. A composition of forces caused by the forces Fn1 pushes the hollow tube 13 to move in the direction from the rear end to the front end of the tube guide 12. In addition, gas is continually injected out from the gaps between the hollow tubes 13 and the film 123 of the tube guide 12. Therefore, a gas pressure of gas in the gap remains relatively small. Thus, the composition of forces pushing the hollow tubes 13 is relatively small. Accordingly, a measuring force acting on the tip extension 16 is relatively small. It can be understood that, the measuring force can be changed by changing a tapered angle of the hollow tubes 13.

Alternative embodiment, the contour measuring probe 10 includes only one hollow tube 13 or more than two hollow tubes 13. In such embodiments, the tube guide 12 defines only one tube chute 121 or more than two tube chutes 121 corresponding to the number of the hollow tubes 13. The hollow tubes 13 may be other shaped driving member such as a solid cylinder or have other shapes, such as a cuboid.

Figure 4:
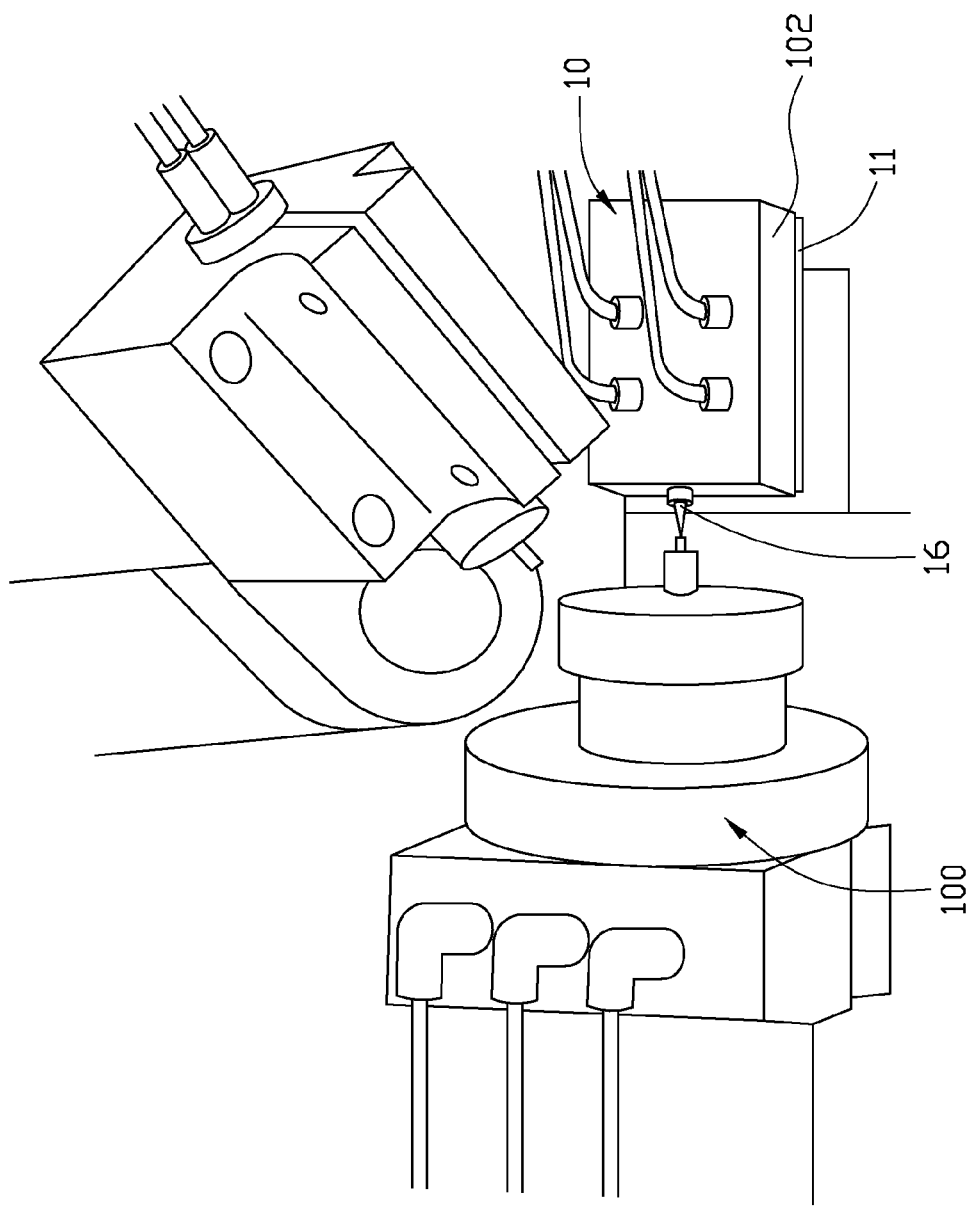
FIG. 4 is an isometric view of an exemplary application of the contour measuring probe of FIG. 1.

When manufacturing precision components such as optical lenses, the optical lenses generally need to be re-machined if they do not have required shape and size. Referring to FIG. 4, the contour measuring probe 10 is applied in an ultraprecise equipment 100 for manufacturing optical lenses. The optical lenses are measured on the ultraprecise equipment 100 immediately after being machined. Therefore, error caused by releasing the optical lenses from a machining equipment and reclamping the optical lenses on a measuring machine is eliminated. In addition, much time can be saved. The contour measuring probe 10 is mounted on a slidable platform of the ultraprecise equipment 100.

In use, the contour measuring probe 10 is placed near the object. The pipes 19 communicate with a gas chamber (not shown), and gas is injected into the slots 122 of the tube guide 12. Then the gas spreads through the films 123 and enters the tube chutes 121. Gas pressure acts on the hollow tubes 13 and pushes the hollow tubes 13 to move towards the object, thereby pushing the tip extension 16 to move towards the object. When the contact tip of the tip extension 16 touches the object, the hollow tubes 13 together with the tip extension 16 stops moving, and the tip extension 16 always gently touches the surface of the object. When the tip extension 16 carries the linear measuring scale 17 to move from one position to another position, the displacement sensor 18 detects and reads a displacement of the linear measuring scale 17. That is, a displacement value of the tip extension 16 is measured. The displacement sensor 18 connected to a processor (not shown) sends the displacement value of the tip extension 16 to the processor.

Figure 5:
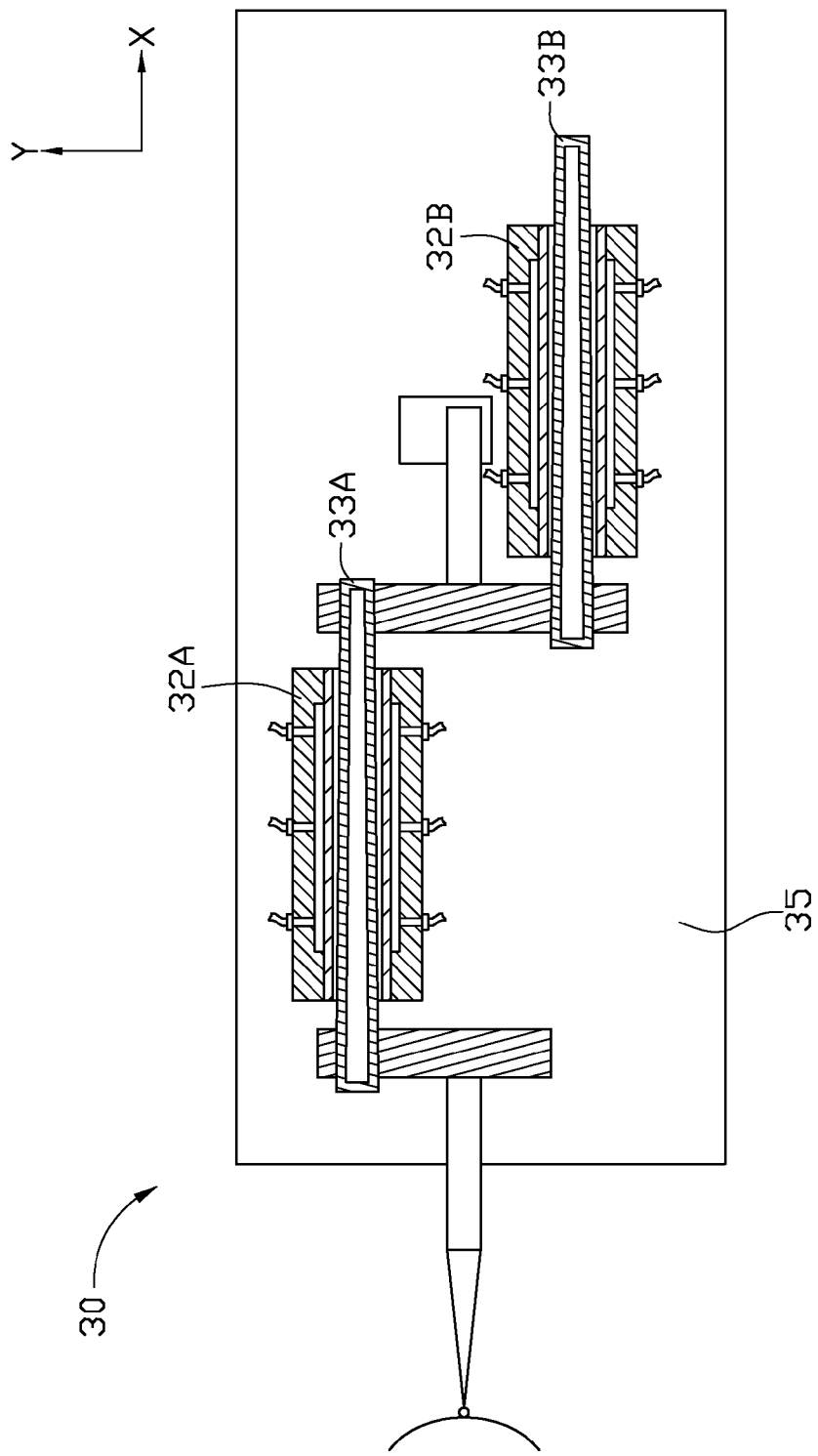
FIG. 5 is a top plan, cross-sectional view of a contour measuring probe in accordance with a second embodiment for measuring aspects of objects of the present invention.

Referring to FIG. 5, a contour measuring probe 30 according to a second embodiment alternative to the first embodiment of the present invention is shown. The contour measuring probe 30 is similar in principle to the contour measuring probe 10 except that tube guides 32A, 32B for holding hollow tubes 33A, 33B are offset from each other in the contour measuring probe 30. That is, the tube guide 32A is set at a front portion of the base 31, and the tube guide 33B is set at a back portion of the base 31. Because the tube guides 32A, 32B are offset from each other, the tube guides 32A, 32B collectively hold the hollow tubes 33A, 33B along a longer length in a direction coinciding with an axis of movement of the tip extension (not labeled), compared with a corresponding length along which the tube guide 12 holds the tip extension 16 in the contour measuring probe 10. Thereby, the tip extension of the contour measuring probe 30 moves very steadily forward and backward with little or no lateral displacement. Alternatively, only one of the hollow tubes 33A, 33B is tapered and gas is injected into one of the hollow tubes 33A, 33B. Thereby, the contour measuring probe 30 is further simplified.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A contour measuring probe, comprising:
   a tip extension for touching a surface of an object; and
   at least one driving member for driving the tip extension linearly to move along a first direction, the at least one driving member being tapered and having its diameter increasing along the first direction, and the at least one driving member driven to move by gas pressure acting on an outer side surface thereof.

2. The contour measuring probe as claimed in claim 1, further comprising at least one tube guide defining at least one tube chute, each of the at least one driving member slidably runs through the one corresponding tube chute of the at least one tube guide.

3. The contour measuring probe as claimed in claim 2, wherein a gap is defined between each driving member and the tube guide, for allowing gas enters therein.

4. The contour measuring probe as claimed in claim 3, wherein a sidewall for defining each tube chute defines a ring-shaped slots communicating with the tube chutes, an porous film is disposed inside each tube chute of the tube guide and between the slot and the corresponding tube chute.

5. The contour measuring probe as claimed in claim 4, wherein the films are made of carbon having a plurality of holes allowing gas to spread therethrough.

6. The contour measuring probe as claimed in claim 4, wherein the outer side surface of the driving member and the film defines a gap therebetween, a gas bearing is formed in the gap when gas enters therein.

7. The contour measuring probe as claimed in claim 4, further comprising at least one pipe communicated with the slots so as to inject gas into the slots.

8. The contour measuring probe as claimed in claim 2, further comprising a base, the tube guide is fixed on the base.

9. The contour measuring probe as claimed in claim 8, further comprising a first fixing member and a second fixing member, the first and second fixing members are fixed to two opposite ends of the at least one driving member.

10. The contour measuring probe as claimed in claim 1, wherein the at least one driving member is a hollow tube having a shape of a frustum of cone.

11. The contour measuring probe as claimed in claim 1, wherein contour measuring probe includes at least two driving members, and the at least two driving members are parallel and abreast to each other.

12. The contour measuring probe as claimed in claim 1, wherein there are at least two driving members, and the at least two driving members are parallel and staggered to each other.

13. The contour measuring probe as claimed in claim 8, further comprising a linear measuring scale and a displacement sensor, the linear measuring scale being configured to display values of displacements of the tip extension, the linear measuring scale fixed relative to one of the tube guide and the tip extension, the displacement sensor being configured to detect and read the displacement values of the tip extension displayed by the linear measuring scale, and the displacement sensor is fixed relative to the other one of the tube guide and the tip extension.

14. The contour measuring probe as claimed in claim 13, further comprising a cover engaging on the base, the at least one driving member, the linear measuring scale, the displacement sensor, and the at least one pipe so as to prevent dust from entering the cover, and the cover defining an opening for allowing a part of the tip extension to extend out therefrom.

\* \* \* \* \*